(12) United States Patent  
Liao

(10) Patent No.: US 7,705,942 B2  
(45) Date of Patent: *Apr. 27, 2010

(54) LIQUID CRYSTAL DISPLAY PANEL

(75) Inventor: Bing-Jei Liao, Tainan Hsien (TW)

(73) Assignee: Himax Technologies Limited, Fonghua Village, Sinshih Township, Tainan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/051,863

(22) Filed: Mar. 20, 2008

(65) Prior Publication Data

US 2008/0192195 A1 Aug. 14, 2008

Related U.S. Application Data

(63) Continuation of application No. 10/708,641, filed on Mar. 17, 2004, now Pat. No. 7,433,011.

(30) Foreign Application Priority Data

Oct. 1, 2003 (TW) .............. 92127223 A

(51) Int. Cl. *G02F 1/1339* (2006.01)
(52) U.S. Cl. ........... 349/130; 349/153; 349/190; 349/123; 349/124; 349/125; 349/126; 349/127; 349/128; 349/129
(58) Field of Classification Search ......... 349/153, 349/155–157, 190
See application file for complete search history.

(56) References Cited

U.S. PATENT DOCUMENTS

| 4,640,583 | A | 2/1987 | Hoshikawa et al. |
| 4,682,858 | A | 7/1987 | Kanbe et al. |
| 5,193,019 | A | 3/1993 | Watanabe |
| 5,517,344 | A | 5/1996 | Hu et al. |
| 5,777,713 | A | 7/1998 | Kimura |
| 5,946,070 | A | 8/1999 | Kohama et al. |
| 5,959,710 | A * | 9/1999 | Yaniv .................. 349/155 |
| 6,373,547 | B2 * | 4/2002 | Saito et al. ............ 349/155 |
| 6,417,908 | B2 | 7/2002 | Nishiguchi et al. |
| 6,724,458 | B2 * | 4/2004 | Kim et al. ............. 349/156 |
| 6,879,369 | B2 * | 4/2005 | Lee et al. ............. 349/187 |
| 6,914,658 | B2 | 7/2005 | Seshan et al. |
| 6,989,879 | B1 | 1/2006 | Nakahara et al. |
| 7,061,560 | B2 * | 6/2006 | Cheng et al. .......... 349/111 |
| 2003/0025868 | A1 * | 2/2003 | Hiroshima et al. ..... 349/156 |
| 2003/0058264 | A1 | 3/2003 | Takako et al. |
| 2003/0103185 | A1 | 6/2003 | Kim |

(Continued)

FOREIGN PATENT DOCUMENTS

GB 2183073 A 5/1987

(Continued)

*Primary Examiner*—David Nelms  
*Assistant Examiner*—Thanh-Nhan P Nguyen  
(74) *Attorney, Agent, or Firm*—Winston Hsu

(57) ABSTRACT

A liquid crystal display panel includes a first substrate, a second substrate, and a liquid crystal layer formed between the first substrate and second substrate. The second substrate has an active region, a sealant surrounding the active region, and a spacer wall located between the active region and the sealant. Additionally, the spacer wall is used to prevent the liquid crystal layer from being contaminated by the sealant and to support the first substrate.

10 Claims, 11 Drawing Sheets

U.S. PATENT DOCUMENTS

| | | |
|---|---|---|
| 2003/0112405 A1 | 6/2003 | Kim et al. |
| 2004/0012750 A1 | 1/2004 | Chung et al. |
| 2004/0160566 A1* | 8/2004 | Kawabe et al. ............... 349/153 |
| 2004/0165127 A1 | 8/2004 | Lin et al. |
| 2004/0252270 A1* | 12/2004 | Lee ............................ 349/153 |
| 2005/0030468 A1 | 2/2005 | Jung et al. |
| 2005/0219456 A1 | 10/2005 | Tadaki et al. |

FOREIGN PATENT DOCUMENTS

| | | |
|---|---|---|
| JP | S58-90617 | 5/1983 |
| JP | H06-175140 | 6/1994 |
| JP | 07-318956 | 12/1995 |
| JP | 2000-258784 | 9/2000 |
| JP | 2003-215603 | 7/2003 |

* cited by examiner

LIQUID CRYSTAL DISPLAY PANEL

CROSS REFERENCE TO RELATED APPLICATIONS

This application is a continuation of U.S. application Ser. No. 10/708,641, filed Mar. 17, 2004.

BACKGROUND OF THE INVENTION

1. Field of the Invention

The present invention relates to a liquid crystal display panel, and more specifically, to a liquid crystal on silicon display panel capable of preventing sealant from contaminating liquid crystal molecules.

2. Description of the Prior Art

A liquid crystal on silicon (LCOS) display panel is a liquid crystal display panel comprising a pixel cell matrix, driving ICs, and other electric elements on a silicon substrate and fabricated by semiconductor processes. It has the advantages of having small pixel sizes, high brightness, high resolution, simple fabricating processes, low cost, and a small volume. Therefore the LCOS display panels have been applied to video and media equipments, such as handy cameras, web mobile phones, projection TVs, and multi-media overhead projectors.

Please refer to FIG. 1 and FIG. 2. FIG. 1 is a top view of an LCOS display panel according to the prior art. FIG. 2 is a sectional view along line 2-2' of the LCOS display panel shown in FIG. 1. As shown in FIG. 1 and FIG. 2, an LCOS display panel 10 includes a glass substrate 12, which is not shown in FIG. 1 but in FIG. 2 for avoiding confusion, a silicon substrate 14 in parallel with and opposite to the glass substrate 12, and a liquid crystal layer 18 formed between the glass substrate 12 and the silicon substrate 14. Additionally, the LCOS display panel 10 further includes an alignment layer 16a located between the glass substrate 12 and the liquid crystal layer 18, and an alignment layer 16b positioned between the silicon substrate 14 and the liquid crystal layer 18. The alignment layers 16a and 16b function to adjust orientations of liquid crystal molecules. The LCOS display panel 10 further includes a sealant 20 surrounding the liquid crystal layer 18 for adhering the silicon substrate 14 to the glass substrate 12. The sealant 20 is usually mixed with silica balls for providing a constant distance between the glass substrate 12 and the silicon substrate 14.

However, the traditional sealant material used in industries may react with the liquid crystal molecules as influencing by the factors of temperature and time or other process factors. It seriously affects the orientations and twists of the liquid crystal molecules in defects and causes contaminations. In this situation, when a common voltage is applied to the liquid crystal layer 18, the liquid crystal molecules near the sealant 20 twist in a different direction from other liquid crystal molecules, and it results in that the display image near the sealant 20 differs from the other positions of the LCOS display panel 10, causing the mura problem, and in decreasing the display performance of the LCOS display panel 10. Furthermore, when the alignment layers 16a, 16b are formed of inorganic materials, such as silicon dioxide ($SiO_2$) or silicon nitride ($SiN_x$), the twist direction of the liquid crystal molecules is even more easily affected by the sealant 20 because of the low anchoring energy between the liquid crystal molecules and the silicon dioxide or the silicon nitride materials.

For solving the mura problem resulting from the sealant 20, the prior art used to increase the distance between the sealant 20 and the active region 14a. However, this reduces the display area of the LCOS display panel 10 or increases the die size of the LCOS display panel 10. Therefore, it is still an important issue to prevent the sealant 20 from contaminating the liquid crystal molecules of the liquid crystal layer 18 so that the display performance of the LCOS display panel 10 can be improved.

SUMMARY OF THE INVENTION

It is therefore a primary objective of the claimed invention to provide a LCOS display panel to solve the above-mentioned problem.

According to the claimed invention, a liquid crystal display panel is provided. The liquid crystal display panel comprises a first substrate, a second substrate having an active region, a sealant positioned on the second substrate and surrounding the active region for adhering the second substrate to the first substrate, a spacer wall positioned on the second substrate and between the sealant and the active region, and a liquid crystal layer positioned between the first substrate, the second substrate, and the sealant, wherein the spacer wall can prevent the liquid crystal layer from being contaminated by the sealant and support the first substrate.

It is an advantage of the claimed invention that the spacer wall is positioned between the sealant and the active region so as to prevent the sealant from contaminating the liquid crystal molecules in the liquid crystal layer, and furthermore to improve the display performance of the LCOS display panel. In addition, the spacer wall can support the first substrate so that silica balls are no longer needed to be mixed in the sealant.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
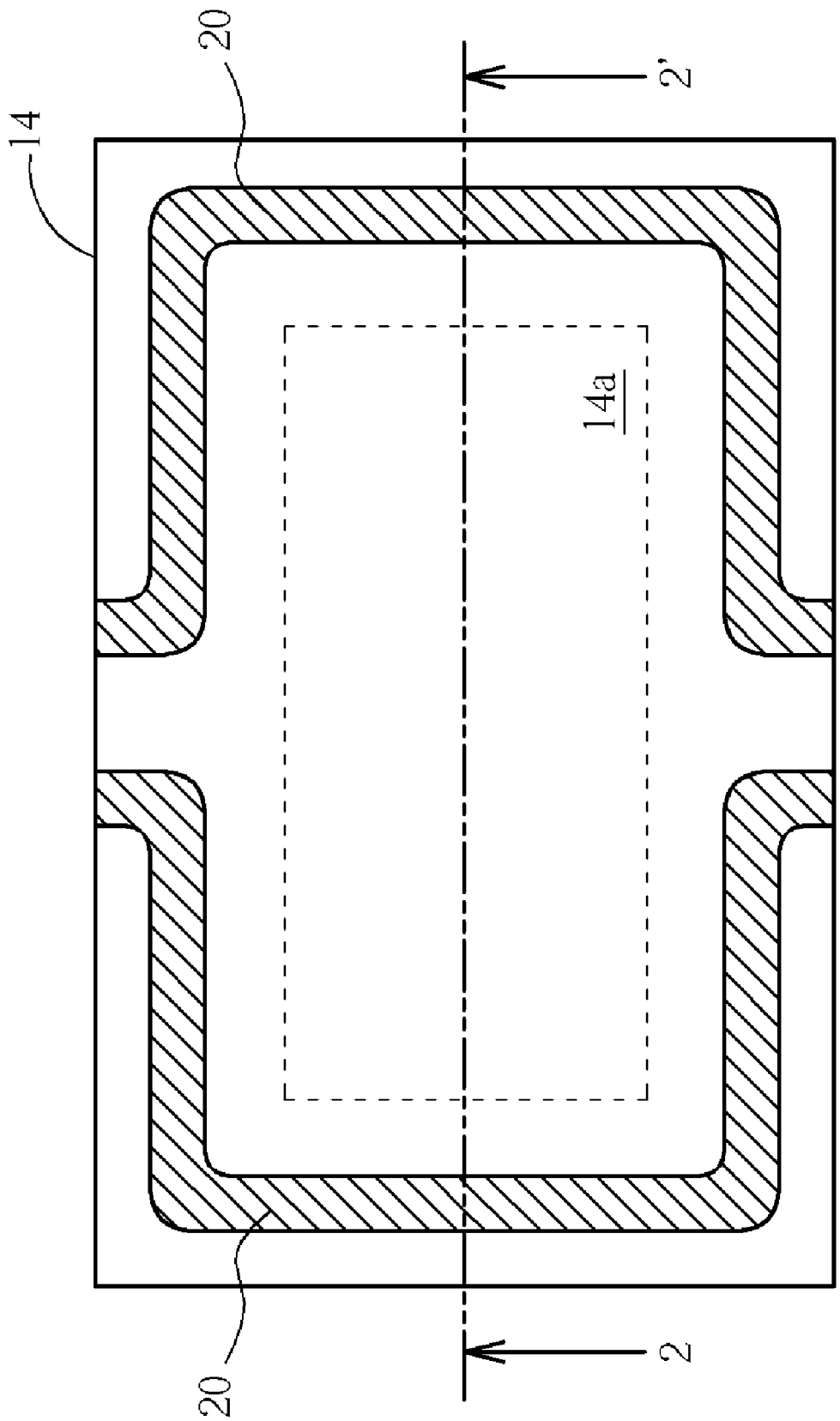
FIG. 1 is a top view of a LCOS display panel according to the prior art.
Figure 2:
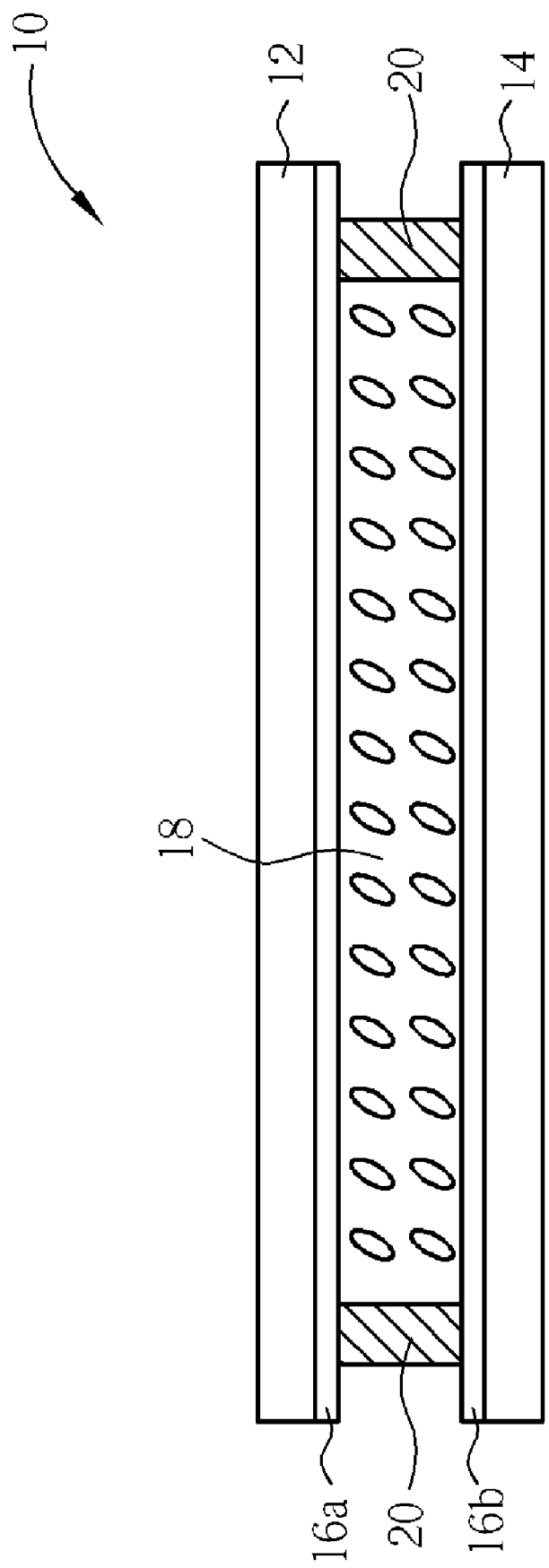
FIG. 2 is a sectional view along line 2-2' of the LCOS display panel shown in FIG. 1.
Figure 3:
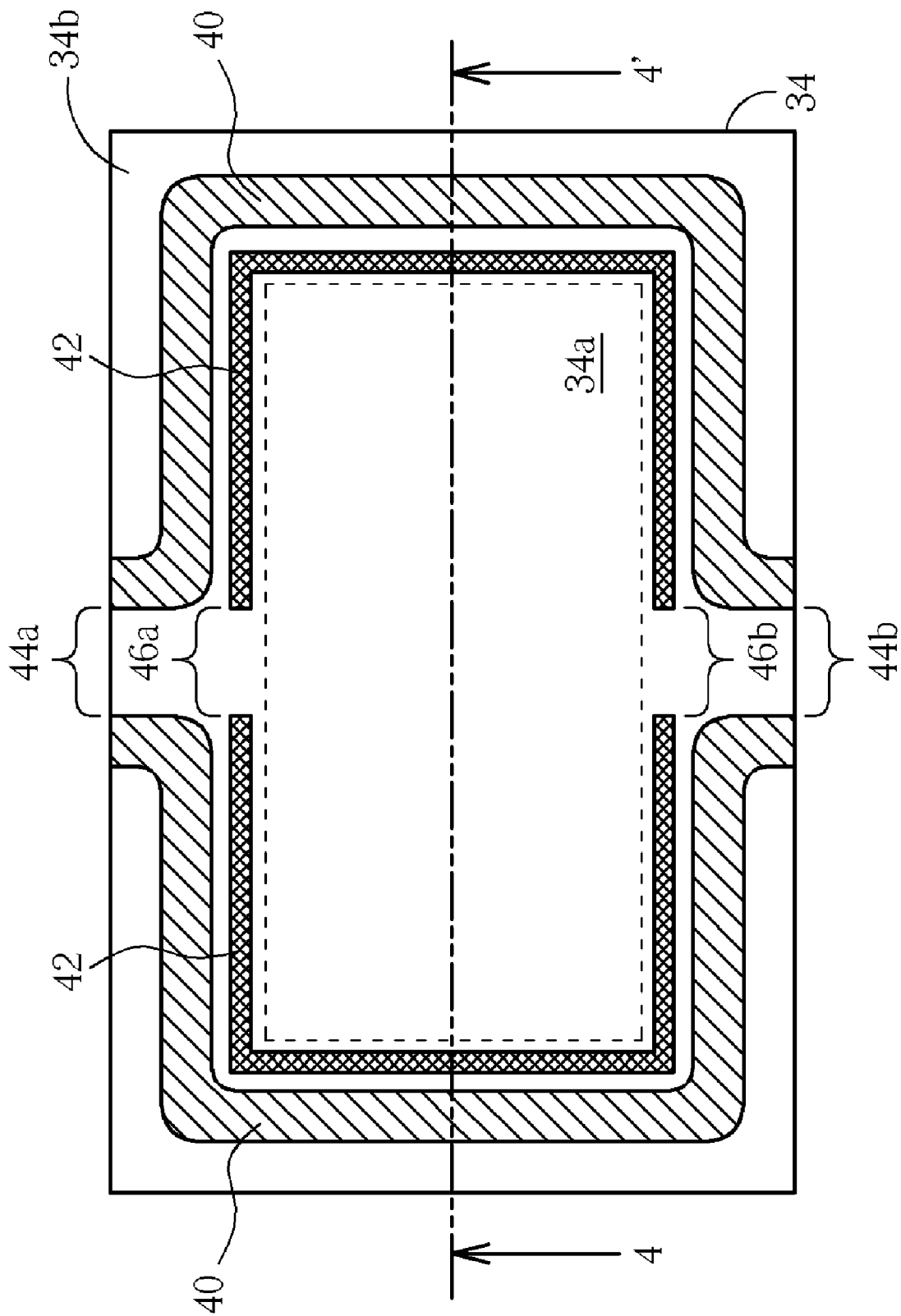
FIG. 3 and FIGS. 5-7 are top views of a LCOS display panel according to a first embodiment of the present invention.
Figure 4:
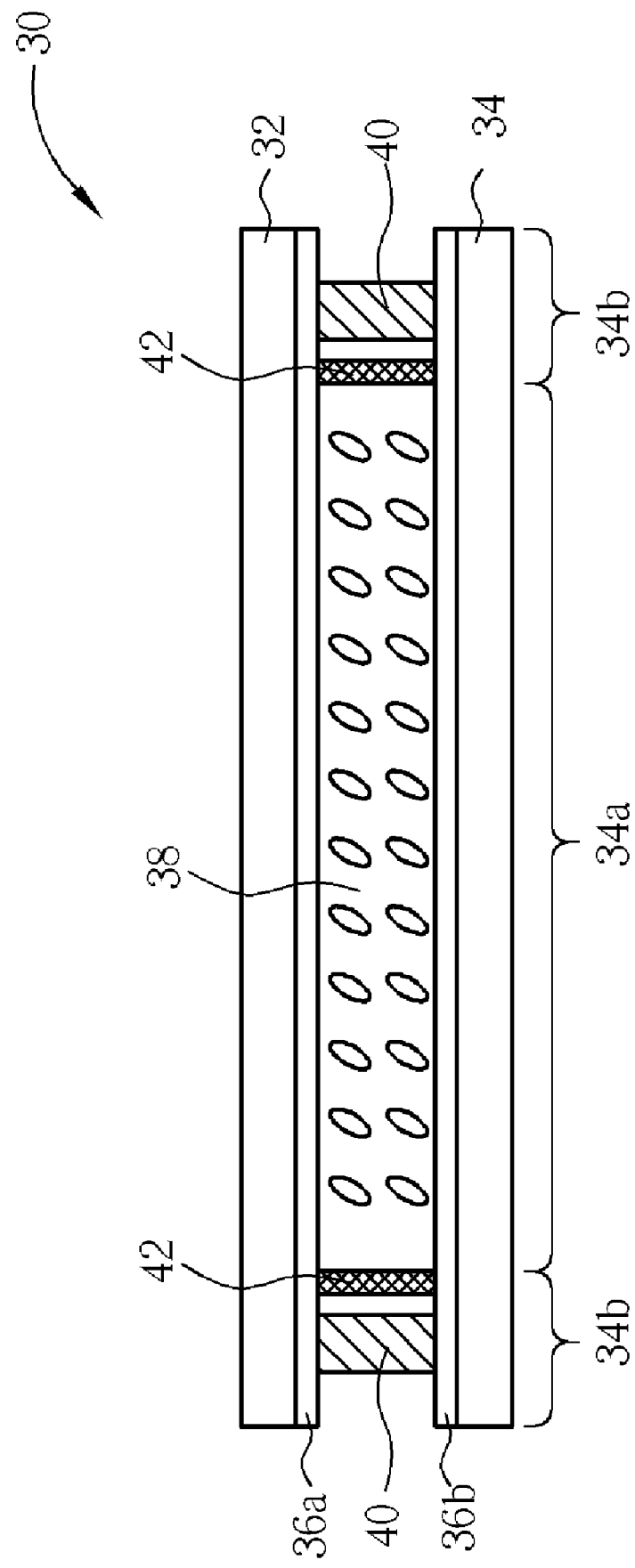
FIG. 4 is a section view along line 4-4' of the LCOS display panel shown in FIG. 3.

Please refer to FIGS. 3-7, wherein FIG. 3 and FIGS. 5-7 are top views of a LCOS display panel according to the first embodiment of the present invention, and FIG. 4 is a section view along line 4-4' of the LCOS display panel shown in FIG. 3. As shown in FIG. 3 and FIG. 4, the LCOS display panel 30 comprises a glass substrate 32 (not shown in FIG. 3), a silicon substrate 34 in parallel with and opposite to the glass substrate 32, and a liquid crystal layer 38 positioned between the glass substrate 32 and the silicon substrate 34. The LCOS display panel 30 further comprises an alignment layer 36a located between the glass substrate 32 and the liquid crystal layer 38, and an alignment layer 36b located between the silicon substrate 34 and the liquid crystal layer 38 for adjusting the orientations of the liquid crystal molecules in the liquid crystal layer 38.

The silicon substrate 34 further comprises an active region 34a on a central portion of the silicon substrate 34 for displaying images, a peripheral region 34b surrounding the active region 34a, and a sealant 40 located in the peripheral region 34b. The main function of the sealant 40 is to adhere the silicon substrate 34 to the glass substrate 32. It should be noticed that the silicon substrate 34 further comprises a spacer wall 42 thereon. The spacer wall 42 is located between the active region 34a and the sealant 40 for isolating the sealant 40 and the liquid crystal layer 38 in order to prevent the sealant 40 from contaminating the liquid crystal molecules in the liquid crystal layer 38, and furthermore to improve the display performance of the LCOS display panel 30. In addition, since the spacer wall 42 of the present invention can effectively isolate the sealant 40 and the liquid crystal layer 38, the distance between the sealant 40 and the active region 34a in this embodiment can be shortened so that the display area of the active region 34a can be broadened or the die size of the LCOS display panel 30 can be reduced. Furthermore, the spacer wall 42 can be used for supporting the glass substrate 32 such that there can be a predetermined distance existing between the glass substrate 32 and the silicon substrate 34. Accordingly, the fabricating process of mixing silica balls in the sealant 40 can be omitted.

In the preferable embodiment of the present invention, the spacer wall 42 and the alignment layers 36a, 36b comprise inorganic materials, such as silicon dioxide ($SiO_2$) or silicon nitride ($SiN_x$), which can be formed by a chemical vapor deposition process with an ion beam treatment, a obliquely sputtering process, or a obliquely evaporation process. In another embodiment of the present invention, the alignment layers 36a, 36b are formed with organic materials, such as polyimide, (PI), and the spacer wall 42 can be formed with photoresist materials.

In addition, as shown in FIG. 3, the sealant 40 contains two liquid crystal injected openings 44a and 44b, and the spacer wall 42 also contains two openings 46a and 46b (also can be referred to as liquid crystal injected openings) corresponding with the liquid crystal injected openings 44a and 44b for injecting liquid crystal molecules into the LCOS display panel 30. Generally, liquid crystal molecules are injected through the liquid crystal injected openings 44a or 44b into the space between the glass substrate 32 and the silicon substrate 34 so as to form the liquid crystal layer 38.

Figure 5:
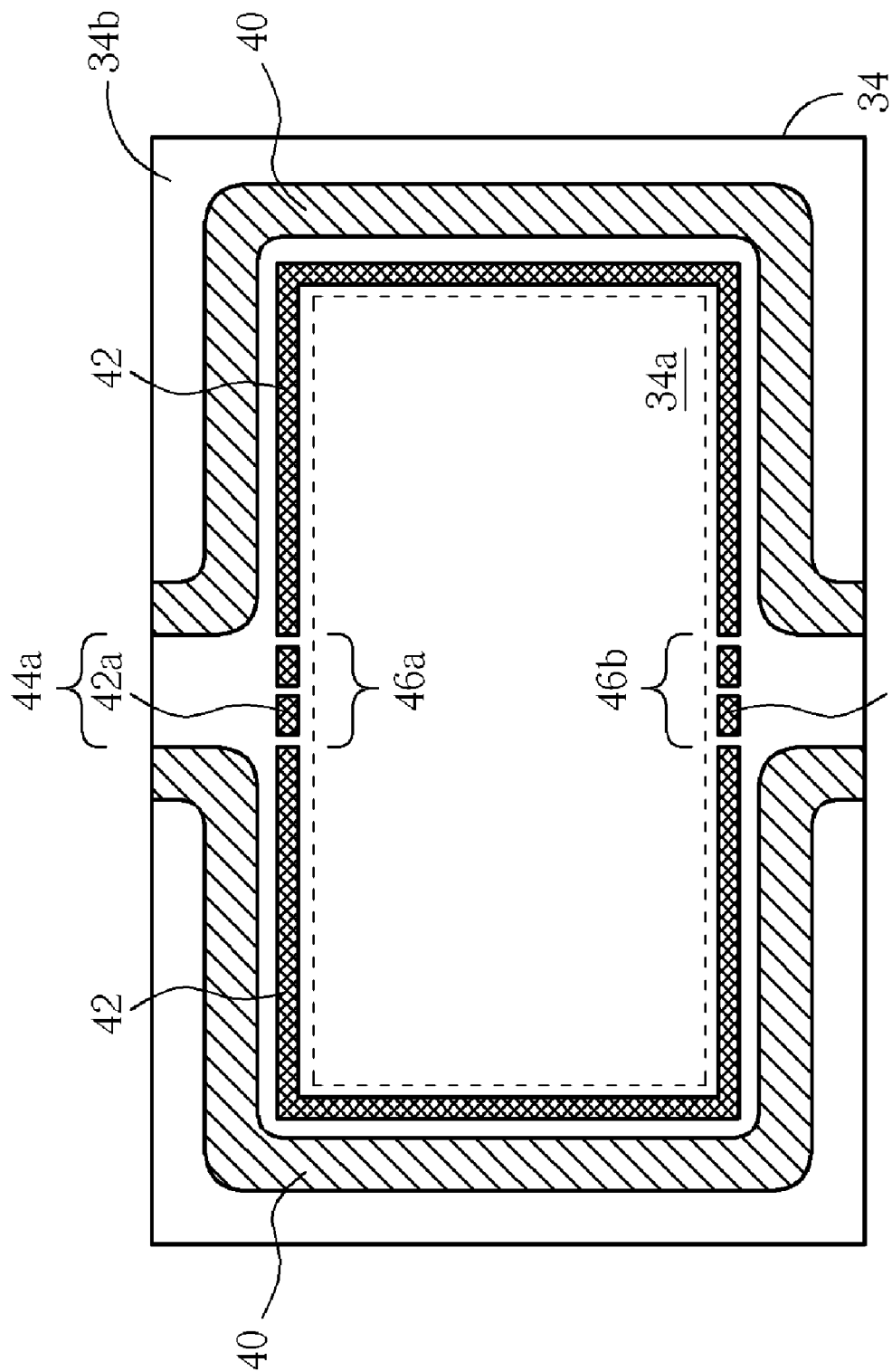
Figure 6:
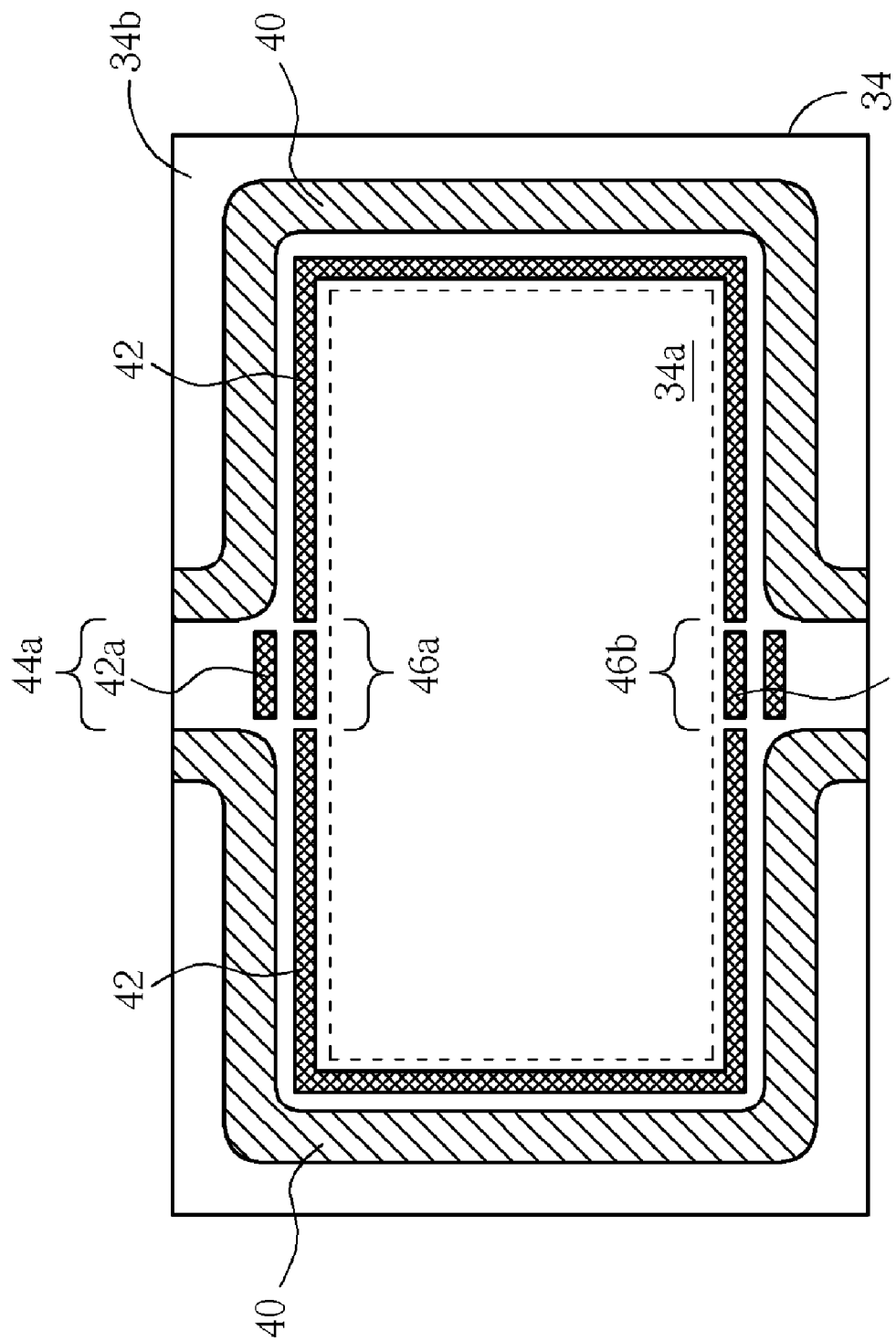
Figure 7:
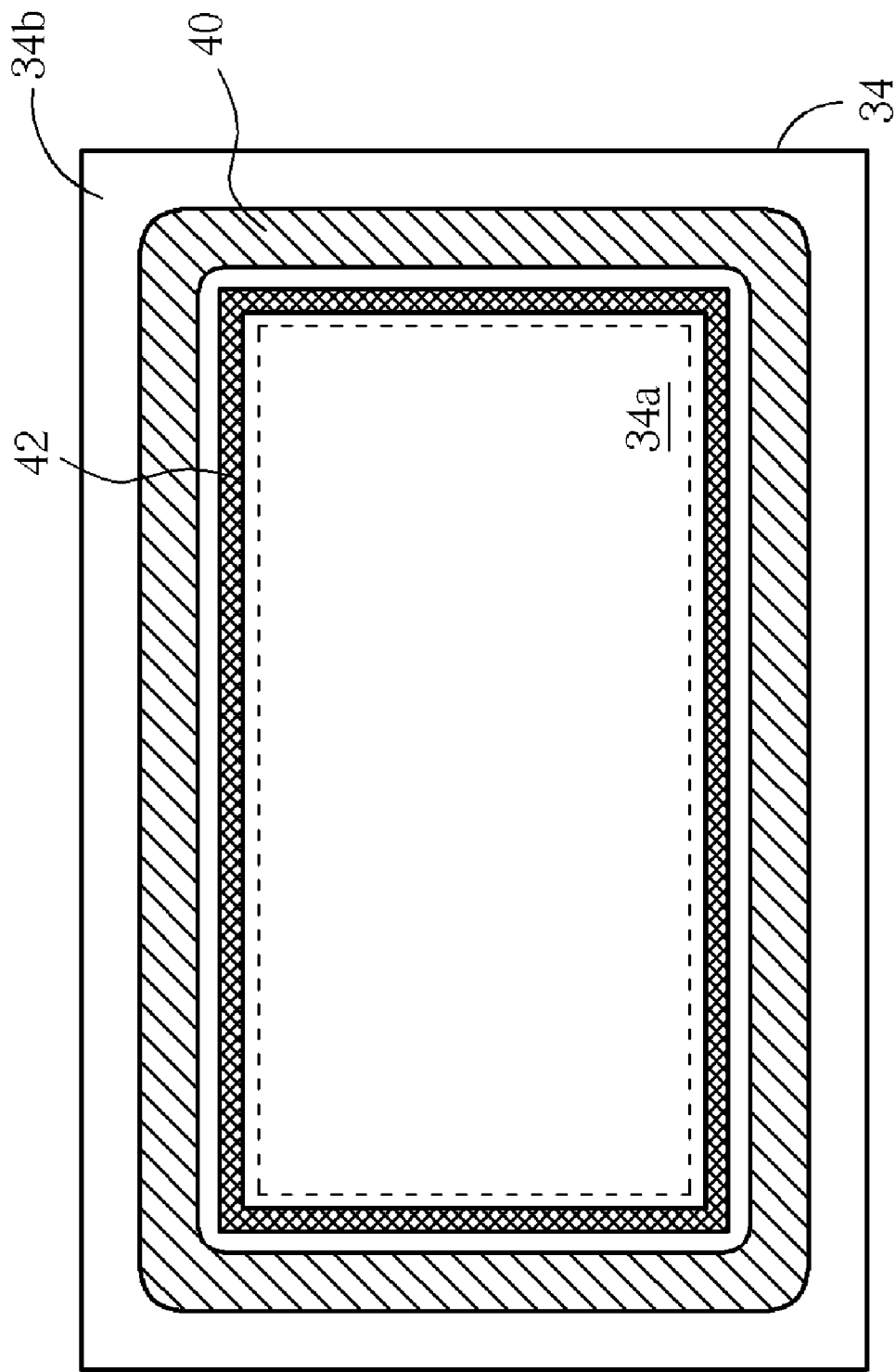

In addition, referring to FIGS. 5-6, the spacer wall 42 can contain a plurality of spacer blocks 42a positioned near the openings 46a and 46b for preventing the sealant 40 from diffusing through the openings 46a and 46b into the active region 34a to contaminate the liquid crystal molecules near the openings 46a and 46b. It should be noticed that the shape, amount, and arrangement of the spacer blocks 42a are not limited in this embodiment and can be changed according to the requirement of the process design or product design. On the other hand, the sealant 40 and the spacer wall 42 may not contain any openings or liquid crystal injected openings when the liquid crystal layer 38 is formed by an one-drop filling (ODF) process, as shown in FIG. 7.

Figure 8:
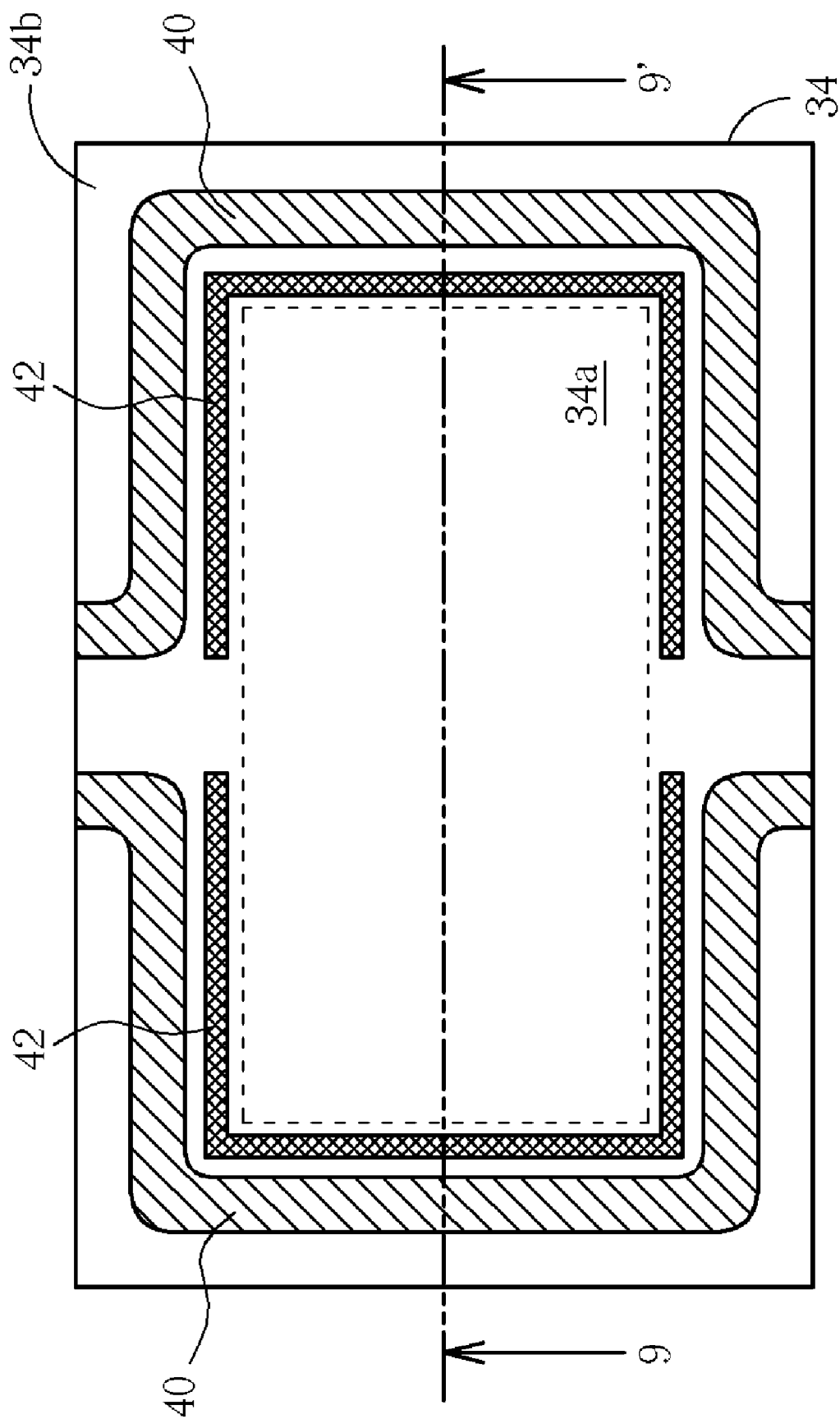
FIG. 8 is a top view of a LCOS display panel according to a second embodiment of the present invention.
Figure 9:
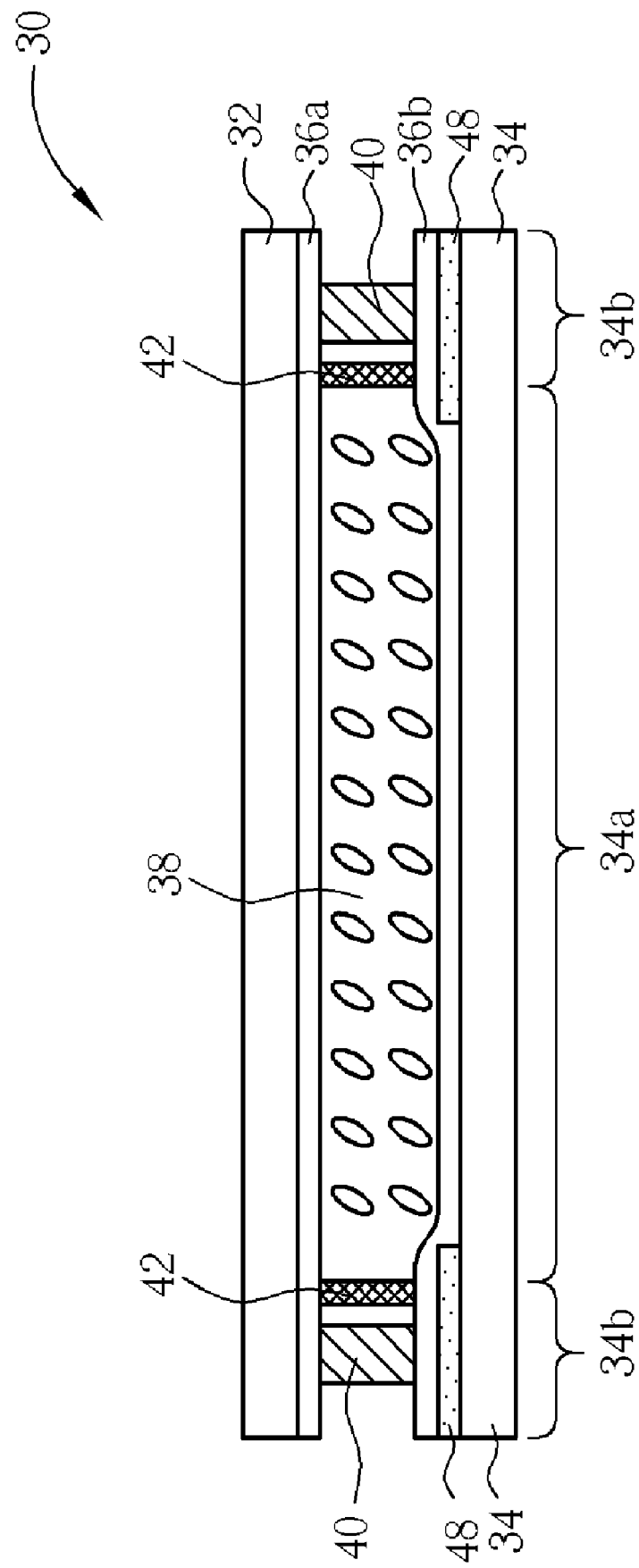
FIG. 9 is a section view along line 9-9' of the LCOS display panel shown in FIG. 8.

For explaining other embodiments of the present invention, several figures are provided with same labels for representing same elements. Please refer to FIGS. 8-9. FIG. 8 is a top view of a LCOS display panel according to the second embodiment of the present invention. FIG. 9 is a section view along line 9-9' of the LCOS display panel shown in FIG. 8. The silicon substrate 34 further comprises an anti-reflective layer 48 positioned in the peripheral region 34b and between the alignment layer 36b and the silicon substrate 34. The anti-reflective layer 48 functions to absorb light beams so that the peripheral region 34b can be kept dark, wherein the anti-reflective layer 48 may comprise a black matrix, such as the material of black resin.

Since most of the contaminated liquid crystal molecules of the prior art are located in the peripheral region 34b, keeping the peripheral region 34b dark with the anti-reflective layer 48 of the present invention can make sure that the contaminated liquid crystal molecules will not contribute to display images. Therefore the mura problem can be avoided so as to improve the display performance of the LCOS display panel 30. It should be noticed that the anti-reflective layer 48 could also be located between the sealant 40 and the alignment layer 36b, or located on the glass substrate 32. In the second embodiment of the present invention, the structure of the spacer wall 42 can be any of the structures in FIG. 3, FIGS. 5-7. However, it should be noticed that the spacer wall 42 could be omitted in the second embodiment of the present invention since the anti-reflective layer 48 can improve the display performance already.

Figure 10:
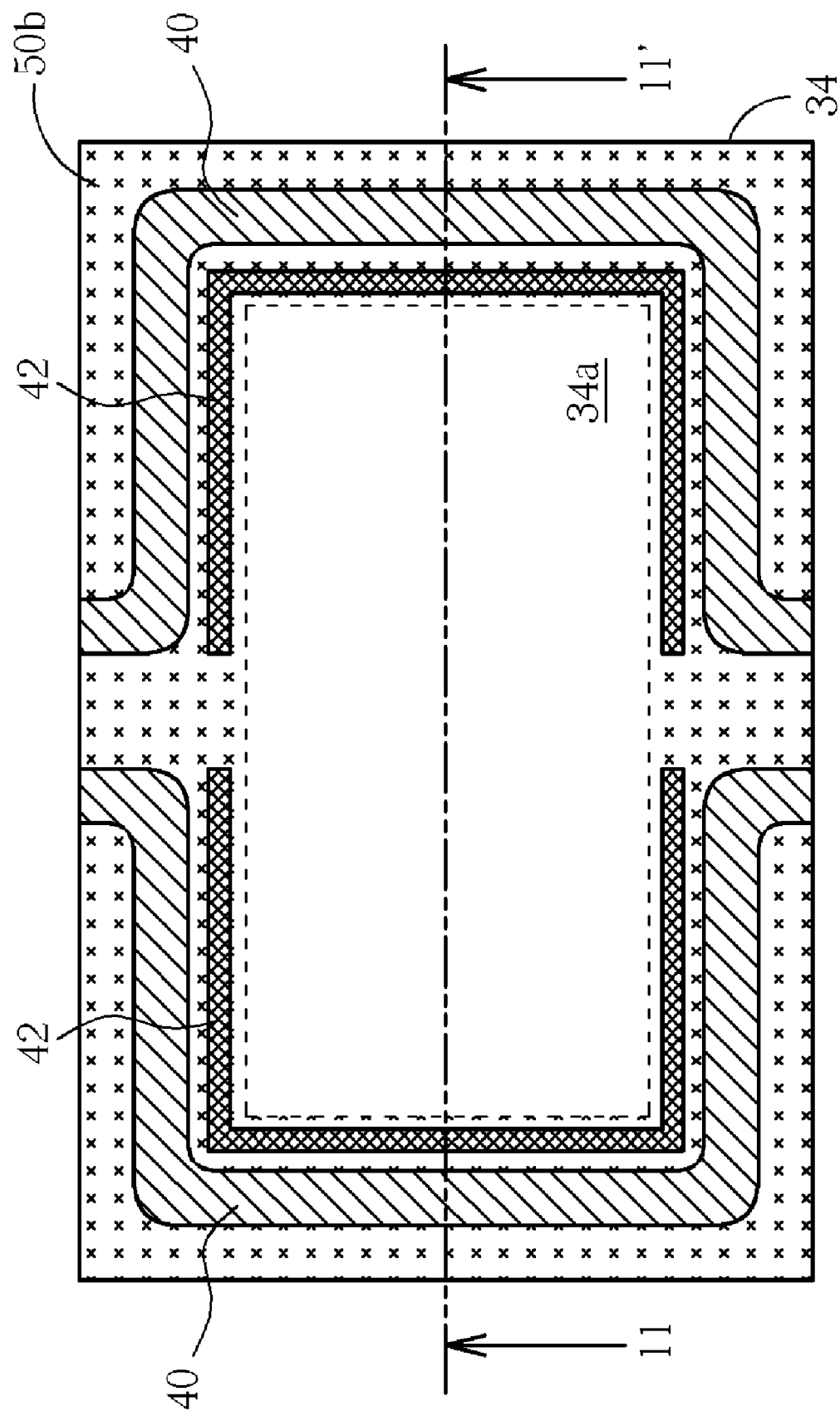
FIG. 10 is a top view of a LCOS display panel according to a third embodiment of the present invention.
Figure 11:
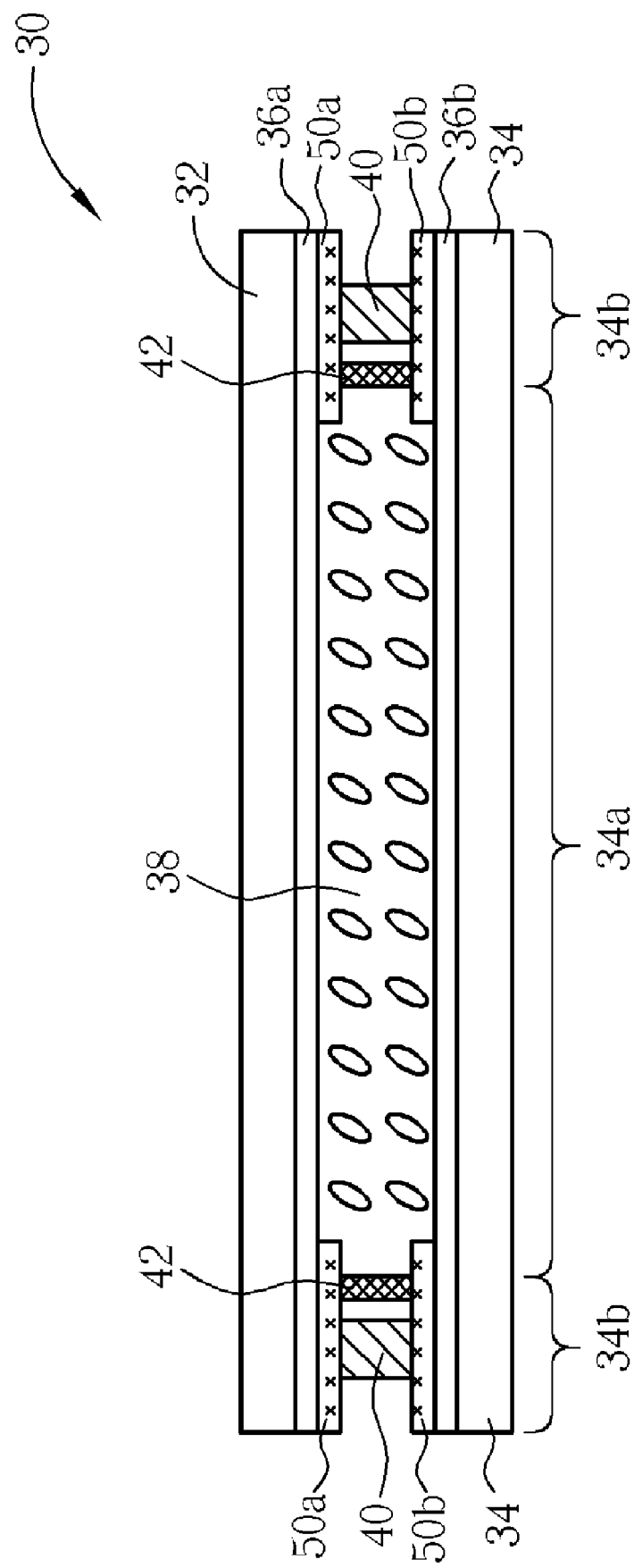
FIG. 11 is a section view along line 11-11' of the LCOS display panel shown in FIG. 10.

Please refer to FIGS. 10-11. FIG. 10 is a top view of a LCOS display panel according to the third embodiment of the present invention. FIG. 11 is a section view along line 11-11' of the LCOS display panel shown in FIG. 10. In contrast to the first embodiment of the present invention, the silicon substrate 34 of the third embodiment of the present invention further comprises an alignment layer 50b thereon, wherein the alignment layer 50b is located in the peripheral region 34b and between the sealant 40 and the alignment layer 36b. In addition, as shown in FIG. 11, the glass substrate 32 also comprises an alignment layer 50a covering the alignment layer 36a opposite to the alignment layer 50b. The alignment layers 50a and 50b are both vertical alignment layers fabricated with APR printing or ink jet printer processes.

The alignment layers 50a and 50b are used for ensuring the major axis or long axis of the liquid crystal molecules is perpendicular to the silicon substrate 34 and the glass substrate 32, which means the functionality of the alignment layers 50a and 50b is to make the liquid crystal molecules in the peripheral region 34b arranged vertically in the silicon substrate 34 and the glass substrate 32. Since the polarization of light beams does not change when they pass through the vertically arranged liquid crystal molecules, the peripheral region 34b can be kept dark as the LCOS display panel 30 has two polarizer films (not shown) perpendicular with each other. As a result, the two alignment layers 50a and 50b are adopted in this embodiment for keeping the peripheral region 34b dark so that the liquid crystal molecules contaminated by the sealant 40 will not be used for displaying images because most contaminated liquid crystal molecules are in the peripheral region 34b. Accordingly, the mura problem can be solved and the display performance of the LCOS display panel 30 can be improved. In this embodiment, the structure of the spacer wall 42 can be designed as the structures of the spacer wall 42 in FIG. 3 or FIGS. 5-7. Furthermore, the spacer wall 42 of the third embodiment of the present invention can also be omitted.

Furthermore, since the peripheral region 34b is kept in a dark state, a high voltage is not needed to be supplied to the liquid crystal molecules of the peripheral region 34b in the second and third embodiments. In addition, the silicon substrate 34 of the present invention can be replaced with a glass substrate, plastic substrate, or other transparent materials. The glass substrate 32 can also be replaced with a plastic substrate or any transparent substrates when applying to other kinds of liquid crystal display panels.

In contrast to the prior art, the present invention provides a spacer wall 42 between the sealant 40 and the liquid crystal layer 38 for preventing the sealant 40 from contaminating the liquid crystal molecules in the liquid crystal layer 38 so that the display performance of the LCOS display panel 30 can be improved. Furthermore, the spacer wall 42 can be used for supporting the glass substrate 32 so as to omit mixing silica balls into the sealant 40. On the other hand, the present invention also provides an anti-reflective layer 48 or alignment layers 50*a*, 50*b* in the peripheral region 34*b* to keep the peripheral region 34*b* dark such that the contaminated liquid crystal molecules will not contribute to display images. Therefore the mura problem of the LCOS display panel 30 can be avoided so as to improve the display performance of the LCOS display panel 30.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display panel comprising:
   a first substrate;
   a second substrate having an active region, a peripheral region surrounding the active region, and a thin film layer patterned corresponding to the peripheral region wherein the thin film layer is a first alignment layer;
   a sealant positioned on the thin film layer of the second substrate and surrounding the active region for adhering the second substrate to the first substrate;
   a spacer wall positioned on the thin film layer of the second substrate and between the sealant and the active region; and
   a liquid crystal layer positioned between the first substrate, the second substrate, and the sealant;
   wherein the spacer wall supports the first substrate and prevents the liquid crystal layer from being contaminated by the sealant.

2. The liquid crystal display panel of claim 1 further comprising:
   a second alignment layer positioned on the first substrate and opposite to the first alignment layer, wherein the first alignment layer and the second alignment layer are both vertical alignment layers.

3. The liquid crystal display panel of claim 1, wherein the spacer wall comprises inorganic materials or photoresist materials, such as silicon dioxide or silicon nitride.

4. The liquid crystal display panel of claim 1, wherein the spacer wall separates the liquid crystal layer from the sealant.

5. The liquid crystal display panel of claim 1, wherein the thin film layer obstructs light so that the peripheral region is kept in a dark state.

6. A liquid crystal on silicon (LCOS) display panel comprising:
   a first substrate;
   a second substrate having an active region;
   a sealant positioned on the second substrate and surrounding the active region for adhering the second substrate to the first substrate;
   a spacer wall positioned on the second substrate and between the sealant and the active region for enclosing the active region; and
   a liquid crystal layer positioned between the first substrate, the second substrate, and the sealant;
   wherein the spacer wall supports the first substrate and prevents the liquid crystal layer from being contaminated by the sealant, the second substrate further comprises a peripheral region surrounding the active region and a first alignment layer patterned corresponding to the peripheral region and positioned under the spacer wall, and both the sealant and the spacer wall are located on the first alignment layer.

7. The liquid crystal on silicon display panel of claim 6 further comprising:
   a second alignment layer positioned on the first substrate and opposite to the first alignment layer, wherein the first alignment layer and the second alignment layer are both vertical alignment layers.

8. The liquid crystal on silicon display panel of claim 6 wherein the spacer wall comprises inorganic materials or photoresist materials, such as silicon dioxide or silicon nitride.

9. The liquid crystal on silicon display panel of claim 6 wherein the spacer wall separates the liquid crystal layer from the sealant.

10. The liquid crystal on silicon display panel of claim 6 wherein the first alignment layer obstructs light so that the peripheral region is kept in a dark state.

\* \* \* \* \*